Sept. 5, 1933.  L. M. RAKESTRAW  1,925,646
WASTE HEAT BOILER HEATED BY GASES FROM DIESEL ENGINES OR THE LIKE
Original Filed Nov. 24, 1930
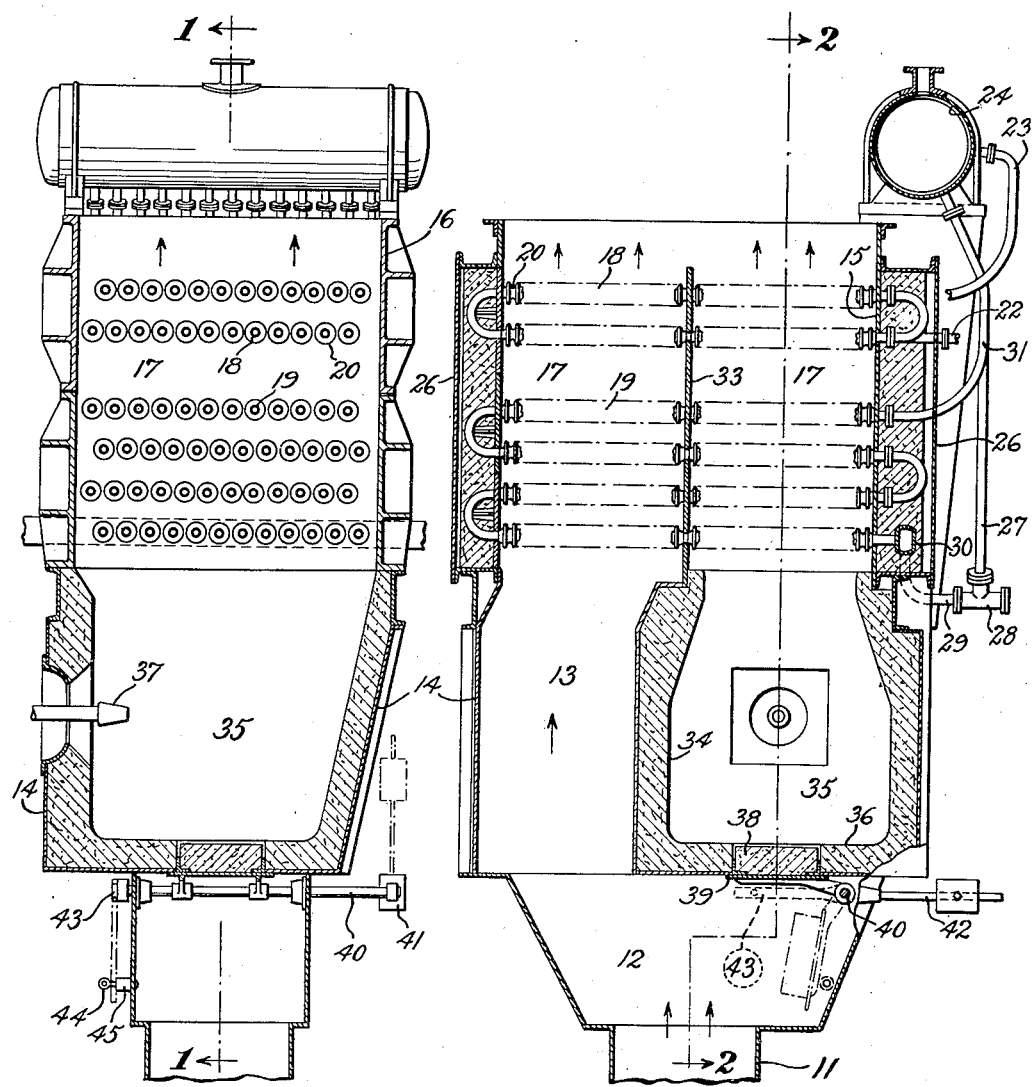
Fig. 2   Fig. 1.
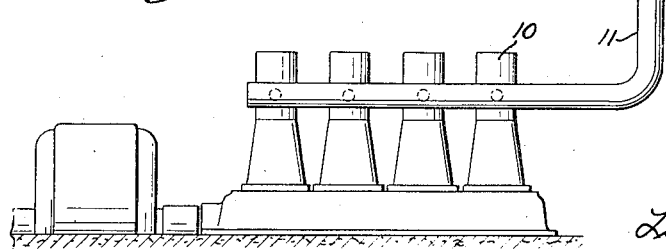
INVENTOR
Linn Maynard Rakestraw
BY
William G. McKnight
ATTORNEY Patented Sept. 5, 1933

1,925,646

UNITED STATES PATENT OFFICE 1,925,646

WASTE HEAT BOILER HEATED BY GASES FROM DIESEL ENGINES OR THE LIKE

Linn Maynard Rakestraw, Beechhurst, N. Y., assignor to Foster Wheeler Corporation, New York, N. Y., a corporation of New York Refiled for abandoned application Serial No. 497,648, November 24, 1930. This application June 29, 1933. Serial No. 678,301

8 Claims. (Cl. 122—7)

My invention relates to waste heat boilers.

My invention consists essentially in the combination with a waste heat boiler receiving gases of pulsating nature from a Diesel engine or the like of means for supplying additional heat other than the waste heat.

The nature of my invention will become apparent from a consideration of the following description taken in conjunction with the accompanying drawing showing a preferred form of the invention.

On the accompanying drawing:

Fig. 1 is a vertical sectional view of a boiler in accordance with the invention supplied with waste gases from a Diesel engine, which figure is taken on the line 1—1 of Fig. 2; and Fig. 2 is a sectional view taken on the line 2—2 of Fig. 1.

Exhaust gases from Diesel engine 10 pass into exhaust conduit 11 which is connected to and forms an inlet for the supply chamber 12 of the waste heat boiler. Above the supply chamber is an intermediate chamber 13 formed by walls 14 and above the intermediate chamber is a heating chamber 17 formed by walls 15 and 16. The outlet for the gases is at the top of the heating chamber 17.

Economizer tubes 18 and boiler tubes 19 extend transversely of the heating chamber 17. In the particular boiler shown, there are two rows of economizer tubes at the top and four rows of boiler tubes below the economizer tubes. The arrangement of tubes may obviously be varied. The tubes are composed of straight steel pipes encased in cast iron members 20. The cast iron members provide a multitude of outwardly tapering fins or gills. These members may be made in a number of ways. Separate rings or groups of rings may be shrunk onto the pipes. The arrangement is such that the pipes are completely surrounded and encased by the cast iron members.

The tubes of each horizontal row or bank are spaced close together, so close that the fins almost contact each other. The rows of tubes are spaced farther apart than the adjacent tubes within individual rows. This provides distinct restrictions in the path of flow of the gases. The gases flowing through the heating chamber are successively restricted and expanded. The tubes are preferably staggered in order to break up the gas flow and cause a tortuous passage for the gases. The purpose of this arrangement is to provide good heating contact and a muffling effect in event the boiler is heated by exhaust gases from a Diesel engine or like source of waste heat.

Water is supplied to the boiler by means of conduit 22, passes in series through the economizer tubes 18 and thence through conduit 23 into steam and water drum 24 which is arranged outside the heating chamber and transversely of the tubes. The economizer tubes are connected by U-bends outside the gas chamber and encased in insulation within casings 26.

Water flows from drum 24 down through one or more side connections 27, one or more T connections 28 and one or more connections 29 into manifold 30 extending the width of the boiler at the height of the lowermost row of tubes. Connections 29 are bent upwardly to connect to the manifold. From manifold 30, the water flows in parallel to all the individual tubes of the lowest row, thence in parallel successively through individual tubes of the other rows and through connections 31 into the bottom of the steam and water drum. U-bends outside the walls in casings 26 connect vertically disposed boiler tubes in series.

One of the side walls 15 is preferably made of a solid plate suitably punched with tube holes, while the other plate is made up of plate segments permitting the use of joints only on one side of the boiler. The purpose is to have the minimum number of joints.

In a combination boiler and muffler of this type the demand for steam may exceed the heat available in the exhaust gases. Auxiliary heating is therefore desirable. Due, however, to the characteristics of certain combinations such as a muffler-boiler supplied with the exhaust gases of a Diesel engine, the arrangement for supplying auxiliary heat must be of special nature. Exhaust gases from a Diesel engine pulsate and the pulsations are apt to have a detrimental effect on the auxiliary heating, especially if such heating devices as oil burners are used. The pulsations are even apt to extinguish the flame of an oil burner. The present invention provides an arrangement whereby the whole surface of the steam generating part of the apparatus is made available for contact with heating gases and yet auxiliary heating may be employed without having the pulsations effect the operation of the auxiliary heating means.

Centrally disposed in the heating chamber 17 is a vertical partition 33 through which the boiler tubes pass. This partition divides the heating chamber into two passes. In the intermediate chamber 13 and in line with partition 33 is a wall 34 of steel cased fire brick forming one wall of a burner housing enclosing a chamber 35 and situated within the intermediate chamber. This burner chamber has four side walls and a bottom wall 36 made of steel cased fire brick or other refractory material. The top is open and communicates with the pass to the right hand, as shown, of partition 33. A burner 37 projects into chamber 35. By building the chamber 35 within the intermediate chamber, considerable space is saved.

In the bottom wall 36 of chamber 35 is a brick-lined door 38. This door is made with overlapping edges 39 to close tightly against the bottom of the wall 36. The bottom of wall 36 is preferably made of metal plating supporting the fire brick of the auxiliary heating chamber. The door 38 is pivoted on a transverse shaft 40 which extends through the supply chamber as shown in Fig. 2 and to which is connected a counter weight 41 on a spindle 42. At the other end of shaft 40 is a lever 43 cooperating with a pin 44 adapted to pass therethrough and into a fixed member 45 to hold the door in open position. Lever 43 and spindle 42 extend horizontally when door 38 is closed. The open position of the door is shown in dash-and-dot lines in Fig. 1, in which position the lever 43 is in the position shown in dash-and-dot lines in Fig. 2. When open, the door 38 is within supply chamber 12 and to one side thereof so as to permit free access of the waste gases from the Diesel engine through the opening in the bottom of the burner chamber and to the boiler surface in the pass directly connected to the burner chamber. In this case, there are two paths for flow of gas, one through and including the burner housing, and the other laterally of the burner housing.

When the Diesel engine is supplying sufficient gas to generate the steam required, the door in the bottom of the burner chamber is open and the gases pass through both sides of the boiler. When the Diesel engine is not supplying enough gas, as when it is running at reduced speed, for example in an installation on a ship, the door in the bottom of the chamber 35 is closed and the oil burner can then be lighted. The door must be closed before the burner is lighted since otherwise the pulsations in the exhaust gas would result in blowing out the oil burner.

It will be seen that particularly for a ship installation the arrangement above described provides a compact unit.

It will be understood that I am not to be limited to the precise structure shown and described, but that the invention is to be gaged by the scope of the attached claims considered in the light of the prior art.

What I claim is:

1. A waste heat boiler comprising walls forming a heating chamber, a supply chamber and an intermediate chamber, a burner housing in said intermediate chamber, a partition dividing the heating chamber into a plurality of passes, said supply chamber communicating with one of said passes through the burner housing and with another of said passes laterally of the burner housing, a plurality of heating elements in said heating chamber, each of said elements extending within both of said passes, and a closure between said supply chamber and said burner housing.

2. A waste heat boiler comprising walls forming a heating chamber, a supply chamber and an intermediate chamber, a burner housing in said intermediate chamber, a partition dividing the heating chamber into a plurality of passes, said supply chamber communicating with one of said passes through the burner housing and with another of said passes laterally of the burner housing, boiler tubes extending transversely of said heating chamber and through said partition, a steam and water drum, connections between the tubes and the drum for causing thermo-siphon circulation, and a closure between said supply chamber and said burner housing.

3. A waste heat boiler comprising walls forming a heating chamber, a supply chamber and an intermediate chamber, a burner housing in said intermediate chamber, a partition dividing the heating chamber into a plurality of passes, said supply chamber communicating with one of said passes through the burner housing and with another of said passes laterally of the burner housing, a boiler tube system including a plurality of relatively closely spaced water tubes extending transversely of said heating chamber and through said partition, and a closure between said supply chamber and said burner housing.

4. A waste heat boiler comprising walls forming a heating chamber, a supply chamber and an intermediate chamber, a burner housing in said intermediate chamber, a partition dividing the heating chamber into a plurality of passes, said supply chamber communicating with one of said passes through the burner housing and with another of said passes laterally of the burner housing, a boiler tube system including a plurality of relatively closely spaced water tubes extending transversely of said heating chamber and through said partition and having extended external surface, and a closure between said supply chamber and said burner housing.

5. A waste heat boiler adapted to be heated by exhaust gases from a Diesel engine or the like comprising a gas inlet and a gas outlet, walls forming a heating chamber, steam generating elements in said heating chamber, means for providing separate paths of flow of heating gases through the boiler from the inlet to the outlet, each of said elements extending within each of said paths of flow, a burner housing in one of said paths of flow and means for shutting off communication between the gas inlet and said burner housing.

6. A waste heat boiler adapted to be heated by exhaust gases from a Diesel engine or the like comprising a gas inlet and a gas outlet, walls forming a heating chamber, steam generating elements in said heating chamber, means for providing separate paths of flow of heating gases through the boiler from the inlet to the outlet, each of said elements extending within each of said paths of flow, a burner housing in one of said paths of flow having refractory walls and a door for shutting off communication between the gas inlet and said burner housing.

7. A waste heat boiler adapted to be heated by exhaust gases from a Diesel engine or the like comprising a gas inlet and a gas outlet, walls forming a heating chamber, steam generating elements in said heating chamber, means for providing separate paths of flow of heating gases through the boiler from the inlet to the outlet, each of said elements extending within each of said paths of flow, a burner housing in one of said paths of flow, a door for shutting off communication between the gas inlet and said burner housing and means for operating the door from outside the boiler setting.

8. A waste heat boiler comprising a lower supply chamber, an intermediate chamber above the supply chamber, and a heating chamber above the intermediate chamber, steam generating elements extending transversely of the heating chamber, a burner housing in said intermediate chamber having an upper opening communicating with the heating chamber, one wall of said burner housing being disposed centrally of the intermediate chamber, a partition vertically above said centrally disposed wall dividing the heating chamber into a plurality of passes, and a door in the bottom of said burner housing.

LINN MAYNARD RAKESTRAW.